Patented Mar. 14, 1950

2,500,893

UNITED STATES PATENT OFFICE 2,500,893

ALKYL BENZYL SEBACATES

Samuel J. Cohen, Henderson, Nev., assignor to Hardesty Chemical Co. Inc., a corporation of Delaware No Drawing. Application December 27, 1948, Serial No. 67,550

4 Claims. (Cl. 260—485)

This invention relates to alkyl benzyl esters of sebacic acid of which the methyl benzyl esters and butyl benzyl esters are examples.

The application is a continuation in part of application Serial No. 628,655 filed by me on November 14, 1945, for "Lower-alkyl benzyl sebacates," now abandoned.

The sebacate esters especially are useful as softeners for synthetic rubbers, particularly the butadiene and acrylonitrile copolymer known as Buna N, and as plasticizers for plastics and synthetic resins. The esters are useful as plasticizers in vinyl resin plastics including those containing straight polyvinyl chloride or copolymers consisting essentially of vinyl chloride with a minor proportion of another vinyl ester, such as vinyl acetate, vinyl cyanide, or vinylidene chloride, the latter being herein considered, for convenience, as a vinyl ester.

Vinyl copolymer resins of this type are available under the trade names Vinylite "VYNW" and "VYNS" which are copolymers of vinyl chloride and vinyl acetate, containing relatively minor proportions of the latter ingredient. Another vinyl copolymer that may be used is "Geon," one type of which is made by copolymerizing the chloride with a relatively minor percentage of vinylidene chloride. Polymerized vinyl chloride alone may also be used as the resin.

In plastics containing such vinyl resins, it is essential for best results under all conditions of use that the plasticizer used should have a very low evaporation rate, should retain its plasticizing action at the lowest temperature to which the plastic compounds may be subjected, as, for instance, at very high altitudes and should remain clear and stable in color when molded at the required temperature of 300° F. or so.

Plasticizers that have been widely used with the vinyl resins include dioctyl phthalate and tricresyl phosphate. These plasticizers in a representative composition with the vinyl resin Vinylite VNYW and in the proportion of 55 parts by weight of the plasticizer to 100 parts of the resin fail in the standard cold crack test at —45° F. and 0° F., respectively. Vinyl resin compositions with both of these plasticizers discolor in molding and clouding appears in the composition containing tricresyl phosphate.

In seeking to solve the problem of a suitable plasticizer for the vinyl resins I have used in preliminary work dibutyl sebacate and dibenzyl sebacate, both of which are used commercially as plasticizers. Of these the dibutyl sebacate was found satisfactory in the cold crack test down to —70° F. when used with Vinylite VYNW. It has, however, an objectionably high rate of evaporation, a Vinylite VYNW plastic sheet containing about 35% of the plasticizer on exposure for 24 hours to a temperature of 250° F. losing 14.4% of the total weight of the composition. The dibenzyl sebacate composition with vinyl resin fails in the cold crack test at —55° F. and develops a slight haze in molding at 300° F.

I have now discovered that certain alkyl benzyl sebacate esters, when blended with the vinyl resins, give plastics that have evaporation rates that are satisfactorily low, pass the same —70° F. cold crack test as does the composition including dibutyl sebacate as the plasticizer, have satisfactory tensile strengths, and remain clear at molding temperatures. The use of these mixed esters gives to the vinyl resin composition the satisfactorily low rate of evaporation such as required heretofore the use of dibenzyl sebacate. The use of the mixed (benzyl alkyl) esters causes the plastic to pass the same —70° F. cold crack test as passed with the highly active but too readily volatilized dibutyl sebacate plasticizer. The plastics containing the benzyl alkyl sebacates also have tensile strengths that, in the representative cases tested, are 15% to 25% or more higher than the tensile strengths for comparable plastics made with the dialkyl sebacates, all as will appear in greater detail later herein.

Briefly stated, the invention comprises a monobenzyl monoalkyl ester of sebacic acid of the general formula $$C_6H_5.CH_2.OOC(CH_2)_8COO.R$$

in which R is a primary or secondary alkyl group containing 1 to 10 carbon atoms. The invention comprises also compositions containing (1) resinous vinyl chloride polymer, copolymers of vinyl chloride with vinyl acetate, or copolymers of vinyl chloride with vinylidene chloride and (2) a mixed ester of the kind described serving as plasticizer for the resin.

The fact that these benzyl alkyl sebacates show a very desirable and heretofore unrealized combination of generally contradictory properties will be evident from the data given in the table. In this table are shown properties of compositions consisting essentially of 100 parts of Vinylite VYNW and 55 parts of the plasticizer, proportions here and elsewhere herein being expressed as parts by weight. Results with dialkyl and dibenzyl sebacates are included for comparison although the dialkyl and dibenzyl sebacates themselves are not a part of this invention.

*Tests of plasticized vinyl resin (VYNW)*

| Sebacate Ester Used as Plasticizer | Loss, Per Cent, by Volatilization 24 hrs. at 250° F. | Cracks at −70° F. |
|---|---|---|
| Dibutyl | 14.4 | No |
| Dibenzyl | 0.5 | Yes |
| Diisooctyl | 1.1 | No |
| Dicapryl | 0.9 | No |
| Benzyl methyl | 6.1 | No |
| Benzyl butyl | 1.0 | No |
| Benzyl hexyl | 3.6 | No |
| Benzyl isooctyl | 1.1 | No |
| Benzyl capryl | 0.7 | No |
| Benzyl decyl | 1.0 | No |

The molded stock with the dibenzyl sebacate as plasticizer was slightly hazy; the stocks with the benzyl alkyl esters were clear.

The dibenzyl stock cracked at −55° F., the others not at −70° F.

As to tensile strength, the effect of substituting an alkyl by a benzyl radical is shown in the following table, the stocks tested being those with 55 parts of the plasticizer for 100 of plasticizer and vinyl resin VNYW and the test being made and reported in the standard manner.

| Sebacate Ester in Stock | Tensile Strength Lbs. per square inch |
|---|---|
| Dibutyl | 2,120 |
| Benzyl butyl | 2,715 |
| Diisooctyl | 2,215 |
| Benzyl isooctyl | 2,552 |
| Dicapryl | 2,415 |
| Benzyl capryl | 2,830 |
| Dicapryl | Incompatible |
| Benzyl decyl | 2,533 |

In no case tested did the substitution of a benzyl for an alkyl radical fail to give a substantial and important increase in the tensile strength, an increase considered to be due to improved compatibility of the benzyl alkyl sebacate esters with the resin, as compared to the dialkyl, without increase of the solvent power to such a point as actually to weaken the resulting vinyl plastic.

Only the mixed alkyl benzyl esters show the combination of all of the desired properties. They are satisfactory not only in the properties shown above but also in elongation, per cent set, modulus at 100% elongation, Shore hardness, and heat stability, all of which have been tested.

As the alkyl group in the sebacate ester there is used a primary or secondary containing 1 to 10 carbon atoms, as, for example, any one of those represented in the esters listed above. No other radical besides benzyl has been found satisfactory as the aryl in the mixed esters if the plastic compositions containing the mixed esters as plasticizers or softeners is to be satisfactory in all the properties listed.

*Method of making esters*

In one process used in making the mixed esters, sebacic acid in purified form is esterified with first one and then the other of the selected alcohols. Thus 1 gram mol of sebacic acid is mixed with a catalytic proportion of sulfuric, hydrochloric or phosphoric acid, ordinarily sulfuric acid in the proportion of about 0.3 to 1.5%, and then with 1 gram mol of benzyl alcohol. The whole is then warmed to about 100° C. or so until the benzyl alcohol is substantially completely esterified. This will occur quickly and is determined to advantage by determining the acidity remaining in the reaction vessel. When the acidity fails to show an appreciable decrease on further warming, it is safely assumed that the reaction with benzyl alcohol is practically ended. The product is then cooled to receive the aliphatic alcohol selected to contain the desired alkyl group. This selected alcohol is then introduced in the amount of at least 1 mol and preferably about 1.2 mols so as to provide a slight excess. There is introduced also about an equal weight of benzene for the purpose of carrying out water by azeotropic distillation. The mixture is then boiled, the vapors sent through a fractionating column and the benzol layer of the condensate returned to the reaction vessel, as in usual esterification practice. When no more water is distilled out, the heating is discontinued. The resulting mixture is filtered and then subjected to distillation until unreacted materials are removed as foreshots. If a good vacuum is available, the alkyl benzyl sebacate may also be distilled as the main fraction of the product.

A modification of this method is satisfactory and in fact recommended, when the aliphatic alcohol contains 6 to 10 carbon atoms. A solution of 1.2 mols of each of the aliphatic alcohol and benzyl alcohol, 1 mol of the sebacic acid, and the catalyst is boiled, with water removal by the benzene method described. When no more water distills, unreacted materials are distilled in vacuo and set aside for reuse. The remaining sebacate ester is washed with a dilute aqueous solution of sodium carbonate, dried by warming in an open dish to 250° F. or so and then mixed with decolorizing carbon and filtered. The filtrate is the desired sebacate ester.

In connection with the following specific examples, it is to be understood that the preparation may be varied by choosing, as the aliphatic alcohol used in any one example, the equivalent weight of any one of the alcohols containing 1 to 10 carbon atoms to the molecule in the methyl to decyl series, the alcohol if used being either primary or secondary. The aliphatic alcohol used may be an alkoxy alcohol, as, for example, hexoxypropanol, hexoxyethanol, or a homolog containing a total of 2 to 10 carbon atoms.

*Benzyl methyl sebacate*

A mixture of 230 g. dimethyl sebacate (1 mol), 150 g. benzyl alcohol (1.2 mols), and 5 g. sodium methylate in 20 ml. methanol was heated with stirring. Distillation started at 95° C. and 66 ml. of methanol were collected by the time 250° C. was reached.

The batch was then cooled to room temperature and dumped into 1 liter cold water, acidified with 10% hydrochloric acid, and then transferred into a separatory funnel. There the ester was washed with water until neutral. The water washings were extracted with 100 ml. benzene and the combined benzene and ester fraction distilled.

The fractions obtained were benzene 70 ml., benzyl alcohol 5 g., dimethyl sebacate 45 g., methyl benzyl sebacate 127 g., and dibenzyl sebacate 108 g. Since there seems to be a loss of some 10%, the wash liquor was checked and found to contain 15 g. sebacic acid, obviously by hydrolysis of one of the esters. The conversion to methyl benzyl sebacate was 42%. This ester, methyl benzyl sebacate, is a liquid at ordinary temperatures, boils at 234° C./10 mm., and freezes at 1° C.

In a second preparation of the same ester, there were charged into a 1-liter r. b. flask 345 g.

(1.5 mols) dimethyl sebacate, 162 g. (1.5 mols) benzyl alcohol and 0.5 g. sodium methoxide. The flask was then attached to a short Vigreaux column and heated. Forty-seven grams of methanol distilled over in the temperature between 150° C. and 250° C. in the flask. The batch was then cooled, washed and neutralized with dilute hydrochloric acid and distilled at 100 mm. pressure. The following fractions were obtained:

| Fraction | Grams | Equivalent to Dimethyl Sebacate, Mols | Equivalent to Benzyl Alcohol, Mols |
| --- | --- | --- | --- |
| Benzyl alcohol | 4 |  | .04 |
| Dimethyl sebacate | 86 | .37 |  |
| Intermediate | 20 | .08 | .04 |
| Methyl benzyl sebacate | 210 | .69 | .69 |
| Dibenzyl sebacate | 130 | .33 | .66 |
| Total mols accounted for |  | 1.47 | 1.43 |

The yield is 98% on the basis of the dimethyl sebacate used and 95% on the basis of the benzyl alcohol. The conversion is 46% to methyl benzyl sebacate and 22% to dibenzyl sebacate.

Benzyl butyl sebacate

Into a 500 ml. flask were charged 157 g. dibutyl sebacate (0.5 mol), 54 g. benzyl alcohol (0.5 mol) and 0.2 g. dry sodium methoxide. The mixture was heated gradually up to 350° C. By then, 37 g. (0.5 mol) butanol was collected. There was no appreciable darkening of the reaction mixture. The pressure was then gradually lowered to 10 mm. and the esters fractionated through a short Vigreaux column. 49 g. dibutyl sebacate, 63 g. butyl benzyl sebacate, and 45 g. high boiling liquid, which was mostly dibenzyl sebacate, were obtained.

The conversion to butyl benzyl sebacate in this preparation is 36%, the total yield about 85%.

A saponification value on the benzyl butyl sebacate fraction was found to be 22.6%. The theoretical value was calculated and found to be 23%. Butyl benzyl sebacate is a liquid, boils at 246° C./10 mm., and freezes at minus 10° C.

In an alternative procedure, a charge of 481 g. (1.5 mols) dibutyl sebacate, 162 g. (1.5 mols) benzyl alcohol and 0.15 g. sodium methoxide was placed into a 1-liter r. b. flask. The flask was attached to a 12 inch Vigreaux column and gradually heated. Around 200° C. in the flask, butanol started to distil out, containing about 13% of benzyl alcohol. A total of 113 g. distillate was collected. The batch was then cooled, washed and neutralized, and distilled at 10 mm. pressure. These fractions were obtained:

| Fraction | Grams | Equivalent to Dibutyl Sebacate, Mols | Equivalent to Benzyl Alc. Mols |
| --- | --- | --- | --- |
| Benzyl alcohol | 10 | 0.44 | 0.10 |
| Dibutyl sebacate | 139 | 0.11 |  |
| Intermediate | 34 | 0.68 | 0.05 |
| Butyl benzyl sebacate | 235 | 0.26 | 0.68 |
| Dibenzyl sebacate | 101 |  | 0.62 |
| Benzyl alcohol in butanol | 15 |  | 0.14 |
| Total mols accounted for |  | 1.49 | 1.59 |

The yield is 99% based on either dibutyl sebacate or benzyl alcohol, the conversion to butyl benzyl sebacate is 45% and to dibenzyl sebacate 17%.

Benzyl hexyl sebacate

A mixture of 1 mol of sebacic acid, 1.25 mols of benzyl alcohol and 1.5 mols of hexyl alcohol (methyl isobutyl carbinol) were charged into an esterification kettle. To this was then added benzene in an amount equal to one-third of the volume of the mixed alcohols and also paratoluene sulfonic acid as esterification catalyst in proportion equal to 0.2% of the total mixture by weight. This mixture was then refluxed, with usual water elimination system, for three hours during which time the percentage of free sebacic acid was reduced to less than 0.1%. The benzene was then stripped off by distilling to a pot temperature of 150° C. and the remaining product was neutralized with dilute sodium hydroxide followed by washing with dilute salt brine. The excess alcohol was removed by distillation under reduced pressure and the product was filtered to obtain benzyl hexyl sebacate, a liquid boiling at 220° C. under a pressure of 5 mm. of mercury and of specific gravity 0.99 at 25° C.

Benzyl capryl sebacate 1 mol of sebacic acid was mixed with 1.5 mols each of benzyl alcohol and capryl (octanol-2) alcohol in a kettle designed for esterification under reflux conditions with continuous removal of water. To the mixture of acid and alcohols was added benzene in an amount equal to one-third of the volume of the mixed alcohols and 0.2% paratoluene sulfonic acid. This mixture was heated under reflux with continuous removal of water for four hours, whereupon substantially complete esterification was effected. The benzene was then removed by distillation under atmospheric pressure followed by distillation in high vacuum to remove the excess benzyl and capryl alcohols. The product was then neutralized with dilute alkali and washed with dilute salt solution. The resulting liquid was dried by heating above the boiling point of water and filtered to yield benzyl capryl sebacate. The pure ester is a liquid of specific gravity at 25° C. of 1.00 and a boiling point of over 250° C. at a pressure of 5 mm. of mercury.

Benzyl decyl sebacate

A mixture of 1 mol of sebacic acid and 1.5 mols each of benzyl alcohol and n-decyl alcohol was placed in a flask, to which was then added benzene in an amount equal to one-third of the volume of the mixed alcohols and 0.2% of paratoluene sulfonic acid. This mixture was then heated under reflux with continuous removal of water until esterification was substantially complete. The benzene and excess alcohols were removed by distillation, first under atmospheric pressure and finally in vacuo, and the remaining product was neutralized and washed. After being dried and filtered, the clear liquid, benzyl decyl sebacate, showed a specific gravity at 25° C. of 1.005 and a boiling point of over 260° C. at 5 mm. of mercury.

Benzyl isooctyl sebacate

Benzyl isooctyl sebacate, made in manner similar to that described above but using commercial isooctyl as one alcohol, is a pale straw yellow liquid of boiling point above 250° C. at 5 mm. pressure. The specific gravity is approximately 1.

It will be understood also that it is intended to cover all changes and modifications of the example of the invention herein chosen for the purpose of illustration which do not constitute departures from the spirit and scope of the invention.

What is claimed is:

1. An alkyl benzyl sebacate of the general formula $C_6H_5.CH_2.OOC(CH_2)_8COO.R$ in which R represents an alkyl radical selected from the group consisting of primary and secondary alkyls containing 1 to 10 carbon atoms.

2. As a new compound, methyl benzyl sebacate.
3. As a new compound, butyl benzyl sebacate.
4. As a new compound, octyl benzyl sebacate.

SAMUEL J. COHEN.

No references cited.